Patented July 29, 1941

2,250,999

UNITED STATES PATENT OFFICE 2,250,999

ACYLATED N-ARYL GLUCAMINES

Richard Pasternack, Brooklyn, and Ellis Vincent Brown, Jamaica, N. Y., assignors to Charles Pfizer & Company, Brooklyn, N. Y., a corporation of New Jersey No Drawing. Application February 7, 1940, Serial No. 317,666

5 Claims. (Cl. 260—211)

This invention relates to the combination of aldehydo acylated sugars with primary amines of the benzene series under reducing conditions to form the corresponding secondary amines. The products are of value in the synthesis of riboflavin and other medicinal substances.

It was disclosed by Skita and Keil in British Patent No. 313,617 that carbonyl compounds may be reacted with ammonia or an amine in the presence of hydrogen and a platinum catalyst to produce amino alcohols. However, it is apparent from the above mentioned specification that the reaction is highly selective. For example, in the case of diketones treated under the specified conditions, only one keto group is converted into an amino group while the other is reduced to an alcohol group.

That the reaction disclosed by these inventors is not generally applicable to carbonyl compounds of the sugar series is confirmed by F. Hoffmann-LaRoche & Co. Aktiengesellschaft in British Patent No. 445,405, which shows that glucose does not undergo the desired reaction, but is reduced to sorbitol when subjected in alkaline medium to the action of catalyzed hydrogen in the presence of an amine, while in acid or neutral reaction of the medium it is inert. It is known in the art that sugars in their aldehydo form are more easily reduced than such lactol forms as d-glucose; therefore, it was to be expected that by the action of catalyzed hydrogen, the aldehydo acylated sugars resulting from the process of our copending application Ser. No. 309,700, filed December 16, 1939, would be reduced to alcohols instead of combining with aromatic amines to form glucamines. However, we have now found that if the aldehydo acylated sugars are first mixed with the desired amines and then treated with catalyzed hydrogen at normal or only slightly elevated temperatures, there is little or no production of alcohols and the glucamines form smoothly and in good yields.

In developing the process disclosed in their British Patent No. 445,405, Hoffmann-LaRoche & Co. Aktiengesellschaft were able to promote the combination of lactol sugars with aromatic amines by using a catalyst of nickel instead of platinum, at pressures of 15 to 20 atmospheres and temperatures of 115 to 135° C. On page 2, lines 30–34, of their specification they emphasize the importance of using a nickel catalyst for this reaction. Our further investigations have shown, however, that in our process using aldehydo acylated ribose the desired reaction takes place with either a platinum, palladium or Raney nickel catalyst. The latter is prepared according to the directions of Covert and Adkins, J. Am. Chem. Soc. 54:4116–7, 1932. The desired ribityl amines are obtained in good yield at ordinary or only slightly elevated temperatures. It is only necessary to mix the aldehydo sugar with the required quantity of amine in methyl alcohol solution containing a nickel, palladium or platinum catalyst and treat the solution with hydrogen at a temperature between 20° and 50° C. No substantial interval of time should occur between the mixing and the hydrogenation, since in the absence of hydrogen, the alkaline amine saponifies the acyl groups, reducing yields and increasing impurities in the product.

*Example 1.*—240 grams aldehydo-tetraacetyl-ribose and 90 grams 4-amino-o-xylene are dissolved in 1200 cc. methyl alcohol containing 200 grams Raney nickel catalyst and hydrogenated under 1500 pounds pressure at 25° C. for about 4 hours. At the end of this time the hydrogen consumption indicates very nearly the theoretical absorption of hydrogen. The solution is then filtered to remove the catalyst and evaporated under vacuum to crystallization of the tetraacetyl-(3,4-dimethylphenyl)-d-ribamine, which gives a melting point of 97–98° C.

$[\alpha]_D^{20°}$ is $-5.8°$ for c, 5% in methyl alcohol solution. The yield is 90% of theory.

*Example 2.*—32 grams of aldehydo-tetraacetyl-ribose and 12 grams of 4-amino-o-xylene are dissolved in 150 cc. methyl alcohol containing 0.3 gram platinum catalyst. The mixture is treated with hydrogen at atmospheric pressure and at 25° C. until the calculated amount of hydrogen has been absorbed. The alcohol is then evaporated to crystallize out the resulting tetraacetyl-(3,4-dimethylphenyl)-d-ribamine, which has a melting point of 97–98° C.

*Example 3.*—16 grams aldehydo-tetraacetyl-ribose (0.05 mole) and 10.5 grams 4-carbethoxy-amino-5-amino-o-xylene are dissolved in 200 cc. methyl alcohol. 20 grams Raney nickel catalyst are added and, after the blowing out of air, the free space in the container is filled with hydrogen at 1500 pounds pressure. Hydrogenation with good agitation is continued at 50° C. until the drop in hydrogen pressure indicates consumption of the theoretical amount. After filtering out the nickel catalyst, the tetraacetyl-(3,4-dimethyl-6-carbethoxyaminophenyl)-d-ribamine may be isolated, if desired, by evaporation of the alcohol solvent. However, it is obtained as a sirup which we have not been able to crystallize, and separation at this stage is of no particular advantage for most purposes. For identification purposes the acetyl groups are saponified by saturating the alcoholic solution with gaseous ammonia and the solution is evaporated to crystallization. The resulting (3,4-dimethyl-6-carbethoxyaminophenyl)-d-ribamine, after recrystallization from methyl alcohol, has a melting point of 168–170° C. and is identical with that described by P. Karrer et al. (Helv. Chim. Acta 18:1447 of 1935).

We claim:

1. Process for the preparation of tetraacetylated N-aryl ribityl amines from aldehydo-tetraacetylated ribose consisting of mixing the aldehydo-tetraacetylatedribose with a primary amine of the benzene series in methyl alcohol solution containing a catalyst selected from the group consisting of the hydrogenation catalysts platinum, palladium and Raney nickel, and reacting the mixture with hydrogen until the calculated amount of hydrogen necessary to reduce the condensation product of the primary amine and the tetraacetyl ribose to the said ribityl amine has been absorbed.

2. Process for the preparation of tetraacetyl-(3,4-dimethylphenyl)-d-ribitylamine, thus characterized that aldehydo-tetraacetylribose is mixed with a chemically equivalent quantity of 4-amino-o-xylene in methyl alcohol solution containing a member selected from the group consisting of the hydrogenation catalysts platinum, palladium and Raney nickel, and subjected to the action of hydrogen at a temperature between 20° and 50° C. until the calculated amount of hydrogen necessary to reduce the condensation product of the substituted xylene and the tetraacetyl ribose to said ribityl amine has been absorbed.

3. Process for the preparation of tetraacetyl-(3,4-dimethyl - 6 - carbethoxyaminophenyl)-d-ribitylamine, thus characterized that aldehydo-tetraacetylribose is mixed with a chemically equivalent quantity of 4-carbethoxyamino-5-amino-o-xylene in methyl alcohol solution containing a member selected from the group consisting of the hydrogenation catalysts platinum, palladium and Raney nickel, and subjected to the action of hydrogen at a temperature between 20° and 50° C. until the calculated amount of hydrogen necessary to reduce the condensation product of the substituted xylene and the tetraacetyl ribose to said ribityl amine has been absorbed.

4. As a new product, tetraacetyl-(3,4-dimethylphenyl)- ribityl amine.

5. As a new product, tetraacetyl-(3,4-dimethyl-6-carbethoxyaminophenyl)-d-ribityl amine.

RICHARD PASTERNACK.
ELLIS VINCENT BROWN.